United States Patent [19]

Kuriyama

[11] Patent Number: 4,796,133
[45] Date of Patent: Jan. 3, 1989

[54] FLOATING MAGNETIC HEAD

[75] Inventor: Toshihiro Kuriyama, Nagaoka, Japan

[73] Assignee: Alps Electric Co., Ltd., Japan

[21] Appl. No.: 15,423

[22] Filed: Feb. 17, 1987

[30] Foreign Application Priority Data

Jun. 3, 1986 [JP] Japan .................. 61-84352[U]

[51] Int. Cl.$^4$ .................................. G11B 5/23
[52] U.S. Cl. ............................. 360/119; 360/126
[58] Field of Search ............ 360/103, 119, 120, 126

[56] References Cited

U.S. PATENT DOCUMENTS 4,709,284 11/1987 Endo .................................. 360/103

FOREIGN PATENT DOCUMENTS 61-16005 1/1986 Japan ................................ 360/120

Primary Examiner—A. J. Heinz
Attorney, Agent, or Firm—Guy W. Shoup; Paul J. Winters

[57] ABSTRACT

A floating magnetic head of the composite type wherein a slider and a magnetic core are joined integrally together, is characterized in that a metallic magnetic thin film is interposed between the abutting surfaces of half cores of a pair made of oxide magnetic material and composing the magnetic core, a gap between the abutting surfaces of the paired half cores is made in the form of a wedge so that it becomes wider as coming closer to the interior, and the width of a magnetic gap is restricted by an end portion of the wedge-shaped gap on the side facing opposite a magnetic recording medium.

2 Claims, 2 Drawing Sheets

FLOATING MAGNETIC HEAD

BACKGROUND OF THE INVENTION

1. Field of the Invention

This invention relates to a floating magnetic head of the composite type wherein a slider and a magnetic core are joined integrally together.

2. Description of the Prior Art

FIG. 4 shows an example of floating magnetic heads of the composite type. An end portion of a slider 11 is formed with a joint groove 12 for receiving a magnetic core 13, in this joint groove 12 being assembled the magnetic core 13. This magnetic core 13 is composed of a pair of half cores 14 and 15, their abutting surfaces defining a magnetic gap 16. FIG. 5 is a front view of the aforementioned magnetic core section. Each of the half cores 14 and 15 is made of an oxide magnetic substance such as Mn-Zn ferrite, these half cores being joined together via a joint material such as glass. A joint portion thus formed defines the magnetic gap 16. In the thus configured magnetic core 13, hitherto, a gap depth d is one of the important factors, and by controlling the gap depth there can be obtained a desired magnetic characteristic. The reason is that if the gap depth d is too large the magnetic flux cannot fly toward the side of a magnetic recording medium, whereas if the gap depth is too small there occurs magnetic saturation and a desired magnetic characteristic cannot be obtained.

In conventional floating magnetic heads of the aforementioned type, the control of the gap depth d is achieved, after the magnetic core 13 is joined with the slider 11, by lapping one side facing opposite the magnetic recording medium and stopping lapping when an appropriate lapping amount has been attained. Thus, the gap depth d cannot visually be confirmed. Accordingly, the control of the gap depth d must rely on experience, perception and the like, and occurrence of variations in preciseness cannot be avoided.

On the other hand, in the field of 8 mm video and the like, in order to enhance the recording density, a metallic magnetic thin film made, for example, of Permalloy or Sendust is generally attached inside the magnetic gap formed by the pair of half cores 14 and 15. This configuration is referred to as a so-called metal-in-gap type which is characterized in that because the saturation magnetic flux density of a metallic substance is high, magnetic saturation can hardly occur and recording of high density can be achieved. It will be thought to apply a magnetic core of the aforementioned type to the floating magnetic head, but, the difficulty in control of the gap depth d also exists in this metal-in-gap type.

SUMMARY OF THE INVENTION

It is an object of the present invention to provide a floating magnetic head which exhibits a variationless magnetic characteristic.

The present invention has been devised on the basis of the discovery that in case a magnetic core of the metal-in-gap type is applied to a floating magnetic head, it is not absolutely necessary to control a gap depth, that is, since the saturation magnetic flux density is high because of the employment of metal, a desired magnetic characteristic can be obtained only through the control of a gap width even if there exists substantially no gas depth, thus, the present invention explodes the practical sense of the conventional floating magnetic head that the control of the gap depth is necessary and indispensable.

In brief, the present invention is characterized in that a gap between the abutting surfaces of half cores of a pair is shaped in the form of a wedge such that it becomes wider as coming closer to the interior, and the width of a magnetic gap is restricted by an end portion of the wedge-shaped gap on the side facing opposite a magnetic recording medium.

DESCRIPTION OF THE PREFERRED EMBODIMENT

An embodiment of the present invention will now be described with reference to FIGS. 1 through 3.

Figure 1:
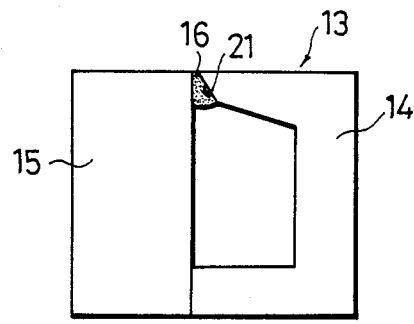
FIG. 1 is a front view of a magnetic core section of a floating magnetic head according to the present invention.
Figure 2:
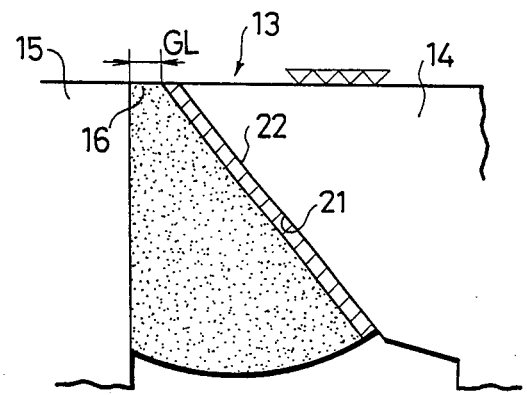
FIG. 2 is an enlarged view of a gap portion shown in FIG. 1.

FIG. 1 shows a magnetic core section of a floating magnetic head according to the present invention. Each of half cores 14 and 15 of a pair composing a magnetic core 13 is made of an oxide magnetic substance such as Mn-Zn ferrite, the half core 14 being C-shaped, and the half core 15 being I-shaped. The abutting surface of the half core 14 against the half core 15 defines a wedge surface 21 which becomes wider as coming closer to the interior from the side slidingly contacting with a recording medium, and this wedge surface 21 confronts the abutting surface of the half core 15 with leaving a gap therebetween, so that a magnetic gap 16 is formed there. Consequently, the magnetic gap 16 widens like a wedge toward the interior from its end portion on the side of the magnetic recording medium, and there exists substantially no gap depth d in the end portion on the side of the magnetic recording medium, which is formed in the prior art. On the wedge surface 21 is formed a metallic magnetic thin film 22 of a few μm in thickness, made of Permalloy or Fe-Al-Si alloys. Thus, the foregoing configuration is substantially identical with the metal-in-gap type, except that there exists substantially no gap depth. The feature of this metallic magnetic thin film 22 is that the saturation magnetic flux density is high and magnetic saturation hardly occurs. The half core 14 and the half core 15 are joined together via a joint material, such as glass, disposed in the wedge-shaped magnetic gap 16, and these elements are accommodated and fixed in a joint groove 12.

Figure 3:
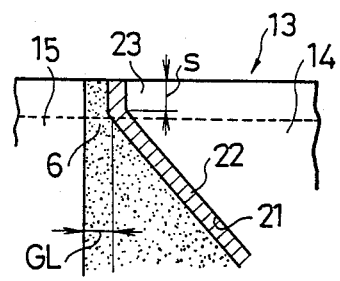
FIG. 3 is a front view showing the gap portion of FIG. 2 before a lapping process.
Figure 4:
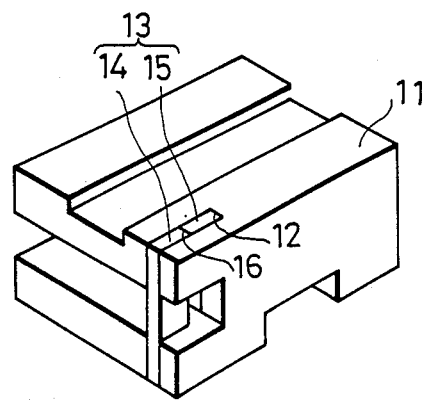
FIG. 4 is a perspective view of an example of floating magnetic heads of the composite type.
Figure 5:
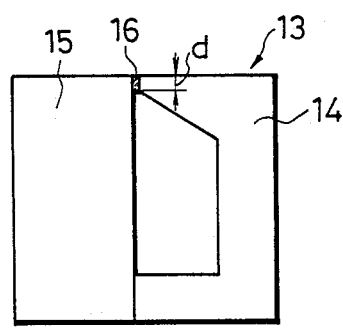
FIG. 5 is a front view of a magnetic core section of a conventional floating magnetic head.

The manufacturing process of the magnetic core 13 is similar to that of the conventional core, but differs therefrom in that, as shown in FIG. 3, a lapping allowance 23 of desired height s having a joining surface being parallel with the abutting surface of the half core 15 is provided on the side of the half core 14 facing opposite the magnetic recording medium. This lapping allowance 23 is used, not to define the gap depth d as in the prior art, but to control a given gap width GL through lapping. Accordingly, the height s of the lapping allowance 23 can be set to a value smaller than that of the prior art.

The control of the magnetic gap 16 according to the present invention is performed in the following manner. Under the condition that the magnetic core 13 shown in FIG. 3 is assembled and joined in the joint groove 12 of a slider 11, the surfaces of the slider 11 and the magnetic core 13 facing opposite the magnetic recording medium are simultaneously lapped. This lapping process is performed while observing the abutting surfaces of the half core 14 and the half core 15 by the use of a microscope from the side facing opposite the magnetic recording medium. Then, as the wedge surface 21 is exposed as the result of the lapping process advanced up to the dotted line position shown in FIG. 3, the lapping process is stopped when the magnetic gap 16 formed by the wedge surface 21 takes a given gap width GL, thereby a desired characteristic being obtained. That is, because this gap width GL can easily be observed from above, it is possible to control the gap width GL without relying on experience, perception and the like in contrast with the prior art. Further, according to the present invention involving substantially no gap depth d, there can be provided the floating magnetic head which is high in preciseness and devoid of variations in magnetic characteristic if the control of the gap width GL only is effected. In the type of magnetic head wherein the magnetic core 13 contacts slidingly with the magnetic recording medium, the manner of controlling the gap width GL as above cannot be accomplished because the gap width GL changes owing to wear of the magnetic core 13 caused by the action of sliding contact. However, in the floating type, because the magnetic core 13 simply faces opposite the magnetic recording medium while keeping a slight spacing therebetween, no change can appear in the gap width GL. Thus, the aforementioned manner of controlling the gap width GL can be applied to the floating type without any problem.

As described hereinabove, according to the present invention, the gap between the abutting surfaces of the paired half cores is made in the form of a wedge so that it becomes wider as coming closer to the interior to thereby substantially eliminate the gap depth, and the width of the magnetic gap is restricted by an end portion of the wedge-shaped gap on the side facing opposite the magnetic recording medium. Thus, there can be realized a variationless magnetic characteristic at a high precision only through control of the gap width without relying on the gap depth in contrast with the prior art. Further, the control of the gap width can be performed by observing it from the side facing opposite the magnetic recording medium without relying on experience, perception and the like of a worker.

What is claimed is:

1. In a floating magnetic head of the composite type wherein a magnetic core having a magnetic gap formed in one medium-contacting side thereof is joined integrally in a slider disposed in floating contact with a surface of a recording medium, an improved gap structure for said magnetic core, comprising:

said magnetic core composed of two core halves, one core half having an abutting portion on said medium-contacting side extending toward the other core half, said abutting portion having a wedge surface facing said other core half which defines a wedge-shaped gap between said core halves, said wedge-shaped gap being filled with a joining material for joining said core halves together;

a metallic magnetic thin film formed over said wedge surface; and said wedge-shaped gap having a predetermined gap width at said medium contacting side and progressively widening in gap width between the core halves in a direction away from said medium contacting side and which is parallel to the gap's depth dimension.

whereby said widening gap width of said wedge-shaped gap and said metallic magnetic thin film formed on said wedge surface forms an equivalent of a metal-in-gap type magnetic core having no gap depth such that saturation magentic flux density is high and magnetic saturation does not occur.

2. A floating magnetic head according to claim 1, wherein the metallic magnetic thin film is made of either Permalloy or Fe-Al-Si alloys

* * * * *